United States Patent
Capron

(10) Patent No.: US 12,049,295 B2
(45) Date of Patent: Jul. 30, 2024

(54) EMERGENCY OPENING DEVICE FOR AN AIRCRAFT DOOR, WITH HANDLE RELEASE

(71) Applicant: LATECOERE, Toulouse Occitaine (FR)

(72) Inventor: Nicolas Capron, Castanet Tolosan Occitanie (FR)

(73) Assignee: LATECOERE, Toulouse Occitanie (FR)

( * ) Notice: Subject to any disclaimer, the term of this patent is extended or adjusted under 35 U.S.C. 154(b) by 612 days.

(21) Appl. No.: 17/291,455

(22) PCT Filed: Nov. 6, 2019

(86) PCT No.: PCT/EP2019/080343
§ 371 (c)(1),
(2) Date: May 5, 2021

(87) PCT Pub. No.: WO2020/094695
PCT Pub. Date: May 14, 2020

(65) Prior Publication Data
US 2022/0003032 A1    Jan. 6, 2022

(30) Foreign Application Priority Data
Nov. 8, 2018    (FR) ...................................... 1860284

(51) Int. Cl.
*B64C 1/14*    (2006.01)
*E05F 1/10*    (2006.01)

(52) U.S. Cl.
CPC .............. *B64C 1/1423* (2013.01); *E05F 1/10* (2013.01); *E05Y 2201/474* (2013.01); *E05Y 2800/252* (2013.01); *E05Y 2900/502* (2013.01)

(58) Field of Classification Search
CPC .......... B64C 1/1423; E05F 1/10; E05F 1/105; E05F 1/1008; E05F 1/1025
See application file for complete search history.

(56) References Cited

U.S. PATENT DOCUMENTS

| | | | | |
|---|---|---|---|---|
| 5,832,562 A | * | 11/1998 | Luca | E05F 3/221 16/49 |
| 5,960,674 A | * | 10/1999 | Brockmeyer | F16F 9/56 267/64.12 |
| 2014/0084600 A1 | * | 3/2014 | Lamat | E05B 65/10 292/92 |
| 2017/0314583 A1 | * | 11/2017 | Koscielniak | E05F 3/108 |
| 2018/0134366 A1 | * | 5/2018 | Merkel | B64C 1/1461 |

FOREIGN PATENT DOCUMENTS

| | | |
|---|---|---|
| EP | 3219603 | 9/2017 |
| EP | 3323709 | 5/2018 |
| FR | 2319758 | 2/1977 |
| FR | 2975967 | 12/2012 |

* cited by examiner

*Primary Examiner* — Marcus Menezes
(74) *Attorney, Agent, or Firm* — Defillo & Associates, Inc.; Evelyn A. Defillo

(57) ABSTRACT

An emergency opening device (1) for an aircraft door having: a tubular operating member (2); elastic compression device (3). The operating member (2) has a first end element (10) and a second end element (11) that can move in translation with respect to one another. The first end element (10) includes a removable driving stop (20).

14 Claims, 6 Drawing Sheets

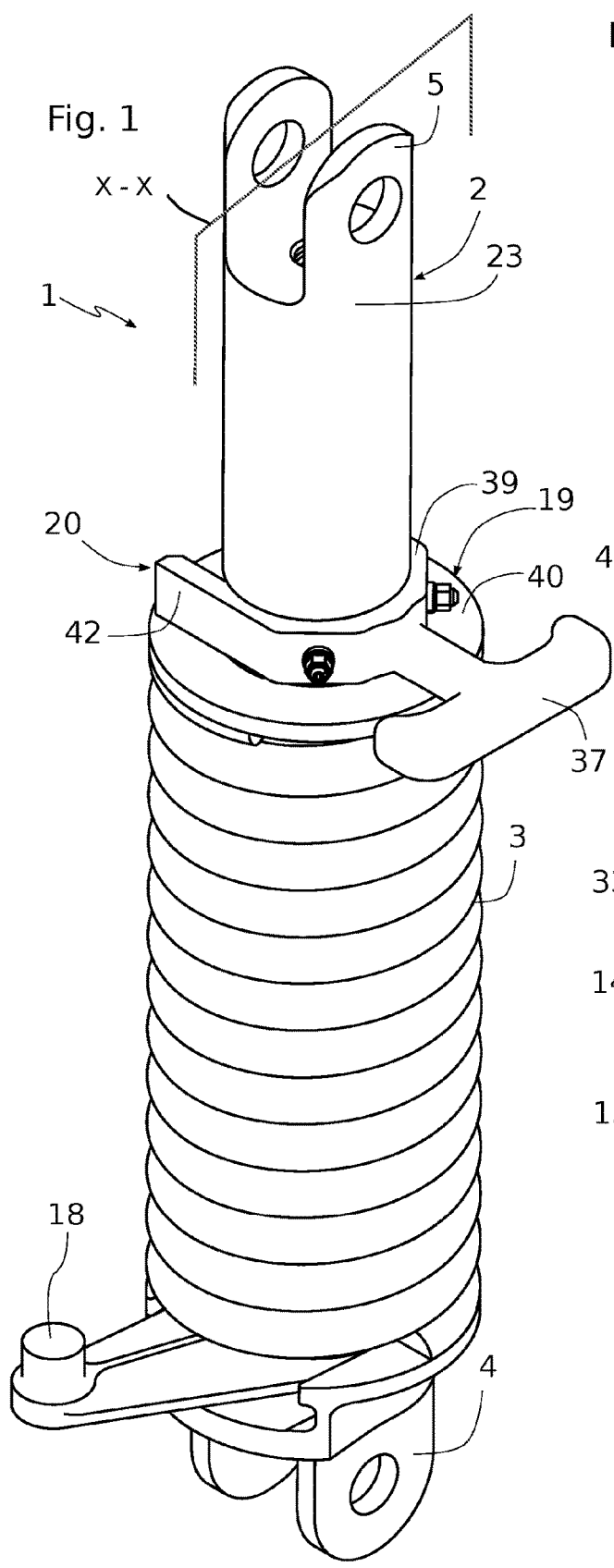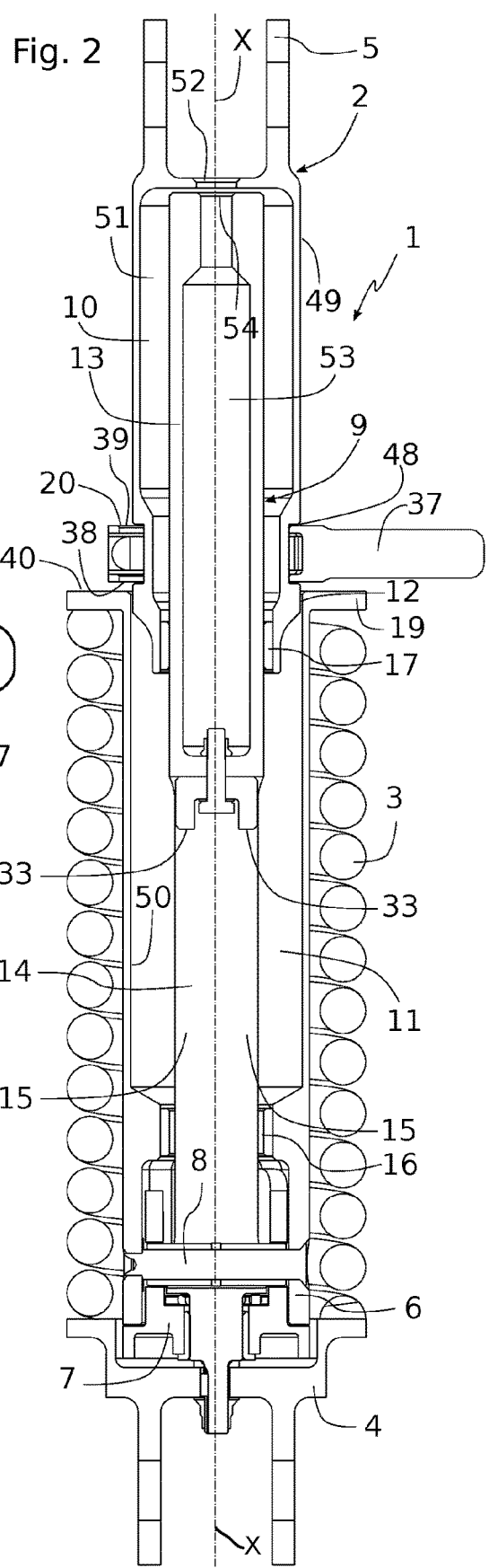

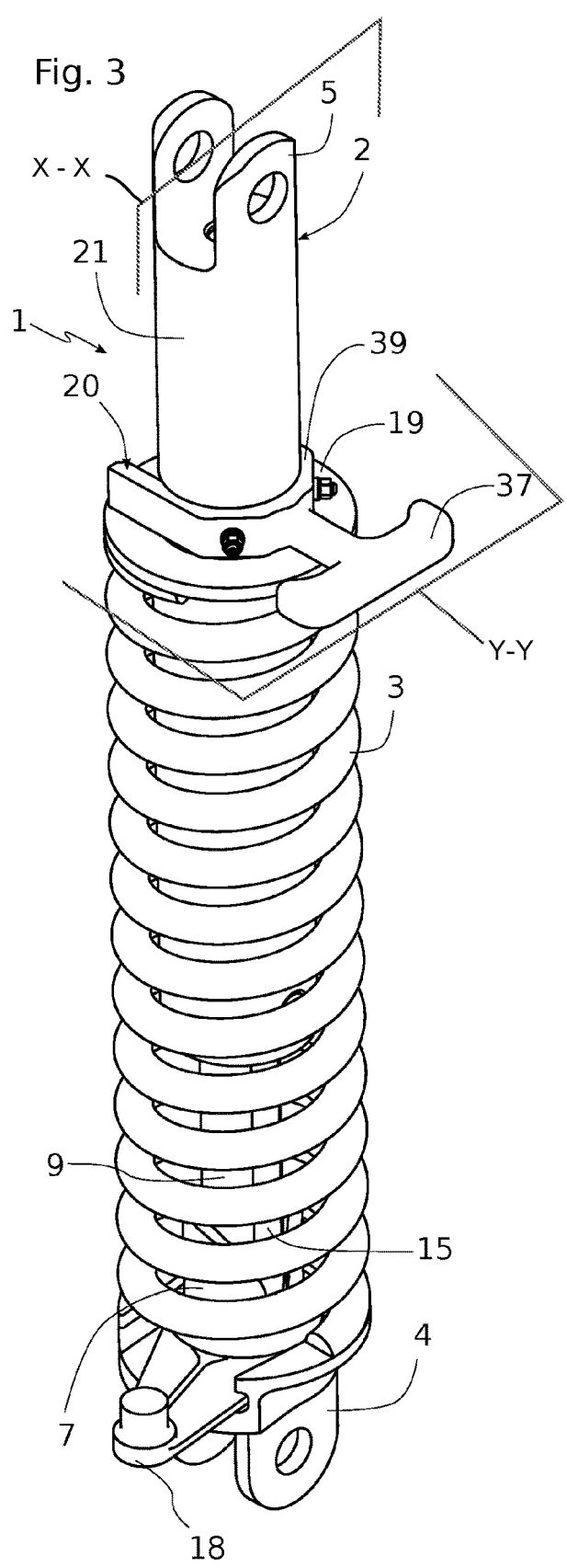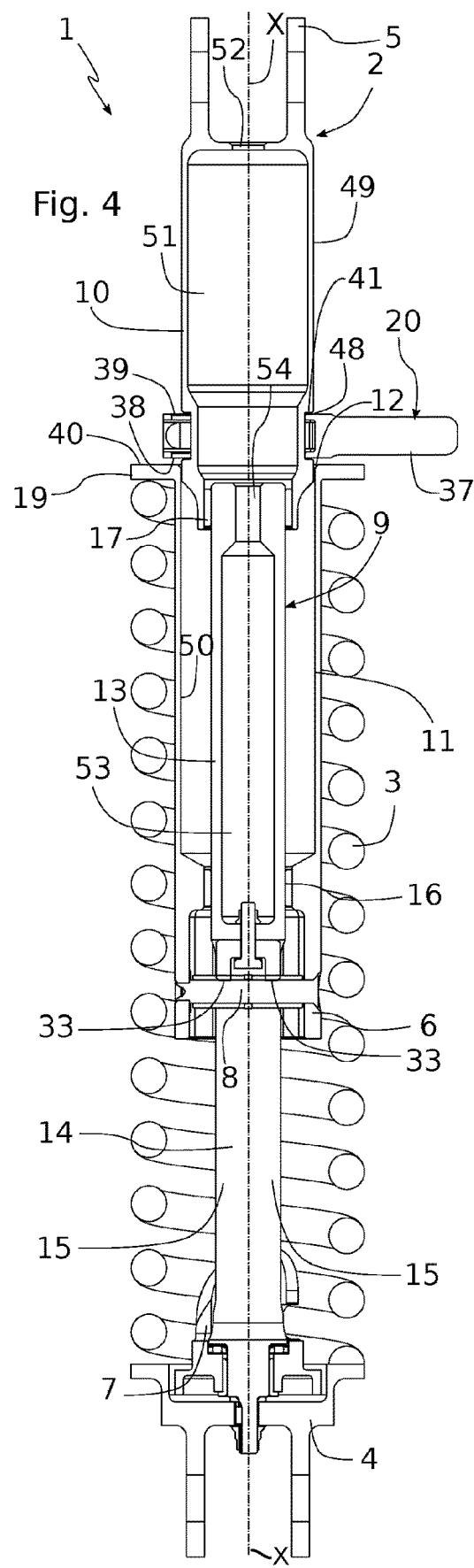

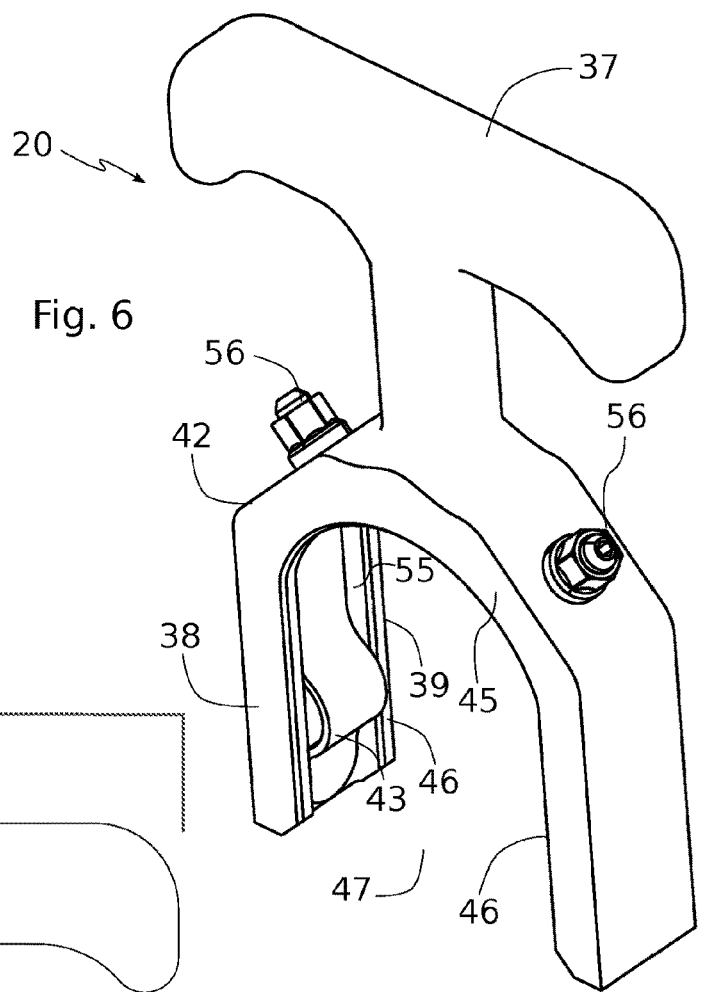
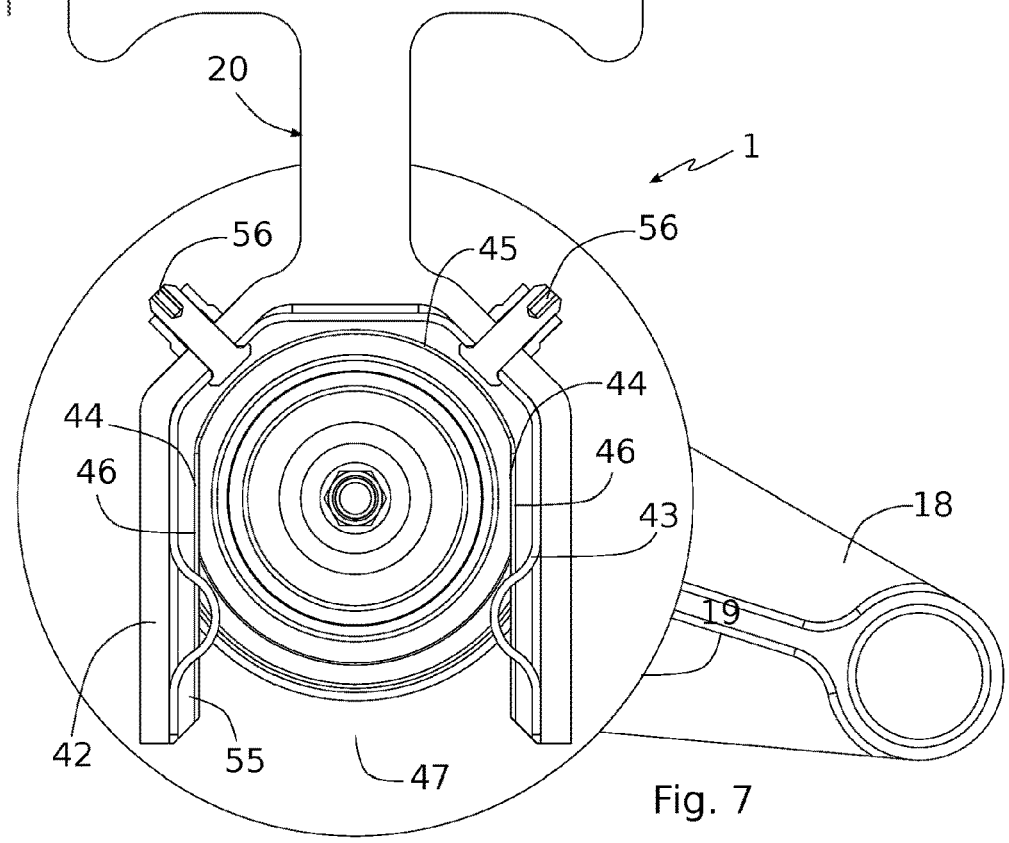
Fig. 6
Fig. 7

EMERGENCY OPENING DEVICE FOR AN AIRCRAFT DOOR, WITH HANDLE RELEASE

CROSS REFERENCE TO RELATED APPLICATION

This application is a national stage entry of PCT/EP2019/080343 filed Nov. 6, 2019, under the International Convention and claiming priority over French Patent Application No. 1860284 filed Nov. 8, 2018.

TECHNICAL FIELD

The invention relates to the field of aeronautics and deals with an emergency opening device for an aircraft door provided with an opening mechanism.

Aircraft doors are provided with an opening mechanism to allow passengers to exit and enter or to allow evacuation in case of emergency. In the event of emergency evacuation of the passengers, the aircraft doors, whether they are passenger doors or emergency evacuation doors, usually comprise an emergency opening device which, if activated, provokes a rapid and automatic opening of the doors, without requiring human intervention other than the activation thereof.

Such emergency opening devices conventionally comprise means for actuating the door opening mechanism, that can be switched between a passive state and an active state provoking the opening of the door, and means for activating the actuation means allowing a user to trigger the emergency opening.

PRIOR ART

The patent application FR2975967 describes an aircraft emergency opening device which consists of actuation means of essentially mechanical design implementing elastic compression means and making it possible to dispense with pneumatic, hydraulic or pyrotechnic elements. The emergency opening device described also fulfils a service opening function allowing the door to be opened and closed in normal operation, that is to say outside of emergency opening phases. After an emergency opening phase, the aircraft door can be reclosed by rearming the emergency opening device using a tool by which a threaded rod is screwed, provoking the compression of the elastic compression means.

SUMMARY OF THE INVENTION

The aim of the invention is to improve the aircraft door emergency opening devices of the prior art.

To this end, the invention targets an emergency opening device for an aircraft door provided with an opening mechanism, comprising:
  means for actuating the opening mechanism, that can be switched between a passive state and an active state of activation of the opening mechanism, and comprising:
    a tubular operating member provided with a first end linking with the door, and a locking second end; elastic compression means disposed between a fixed stop element and the operating member; a member for retaining the locking second end, that can move between a closed position of locking of the locking second end, in a position of the operating member corresponding to the passive state of the actuation means in which the elastic means are kept compressed, and an open position of release of the locking second end allowing the displacement of the operating member on an axis of displacement to a position corresponding to the active state of the actuation means, under the effect of the effort resulting from the expansion of the elastic means;
  means for activating the actuation means designed to drive the opening of the retaining member.
In this device:
  the operating member comprises a first end element and a second end element that can move in translation with respect to one another on the axis of displacement, the first end of the operating member being situated on the first end element and the locking second end of the operating member being situated on the second end element;
  the first end element comprises a removable driving stop having a first face for contacting the second end element.

In the present description and the claims, the expression "link with the door" is understood with respect to the aircraft door in the broad sense. The aircraft door in the broad sense includes the door opening, the door opening mechanism, or even the structure framing the door and linked to the fuselage (corresponding to the architrave of the door). Thus, the first end of the actuation member is linked to an element of the door (opening, opening mechanism, or architrave structure) and the fixed stop element is linked to another element of the door (opening, opening mechanism, or architrave structure) such that the expansion of the elastic means provokes the actuation of the door opening mechanism, and the actual opening of the door. For example, the first end of the actuation member can be fixed to the door opening mechanism, and the fixed stop element can be fixed onto the door opening. As another example, the first end of the actuation member can be fixed onto the door opening, and the fixed stop element can be fixed onto the door architrave structure.

Such an emergency opening device offers all the advantages of a mechanical device as described in the document FR2975967. The mechanical design of the actuation means does not require any particular maintenance in the absence of use of the opening device. The use of the opening device does not mean having to replace a trigger member, as with the pneumatic or pyrotechnic devices. No driving medium is needed to activate the actuation means.

The emergency opening device according to the invention also has a reduced weight and bulk. All the functions linked to the triggering of the emergency opening and to the service opening are grouped together about one and the same axis of displacement of the actuation member. Such a device forms a finished product of mechanical cylinder type that is entirely autonomous, which is a guarantee of reliability and of dependability that are appreciable qualities in the field of aeronautics and more particularly emergency opening devices. In addition to the weight saving, which is a critical characteristic in aeronautics, the compactness of the device allows it to be installed in complex aircraft doors, comprising numerous devices such as safety devices, portholes, viewing devices, various assistance devices, esthetic cowlings, etc.

The service opening function is fulfilled by particularly compact means forming part of the operating member. The arrangement of the operating member, which is composed of a first end element and of a second end element, allows this service opening function to be implemented when the emergency opening device is in the passive state, that is to say during the normal operation of the aircraft door. The aircraft door can thus be opened and closed in the conventional manner to allow the embarkation and debarkation of the passengers and the locking of the door during the flight of the aircraft. Furthermore, the means allowing this service opening are, here, exploited to fulfil an additional function of release of the emergency opening device. In fact, in an emergency opening case, the actuation means of the opening mechanism are switched to their active state which drives the rapid opening of the door under the effect of the elastic compression means. Following this emergency opening, the door is held in open position under the effect of the ongoing stress from the elastic compression means. The release of the emergency opening device makes it possible to reclose the aircraft door rapidly, without having to rearm the latter, that is to say without having to recompress the elastic compression means. The elastic compression means, provided for a rapid opening of the aircraft door, have a strong rating which makes the rearming of the emergency opening device lengthy and difficult.

The release of the emergency opening device makes it possible, for example, during maintenance operations, to test the emergency device by activating it and by nevertheless being able subsequently to easily and rapidly reclose the aircraft door by the action of a single operator. Furthermore, in an emergency opening case, it may be that the crew member who activated the emergency opening device observes, after the rapid opening of the door, that the latter has opened onto a dangerous environment. In this case, the release of the emergency opening device allows this crew member to immediately reclose the door by acting directly on the removable stop and by manually reclosing the door. In these conditions, the aircraft door can be operated to open and close normally even through the emergency opening device has been triggered. That not only allows the emergency closure of the aircraft door as described previously, but also allows the aircraft to take off again until a next maintenance operation in which the emergency opening device will be rearmed.

Although the emergency opening device incorporates these additional service opening and release functions, it remains entirely mechanical, guaranteeing operation independent of any energy source, as well as enhanced reliability.

The emergency opening device can comprise the following additional features, alone or in combination:
- the first end element comprises an outer cylindrical portion that can be fitted into an inner cylindrical portion of the second end element;
- the removable driving stop is mounted in a groove formed in the outer cylindrical portion of the first end element;
- the first end element comprises at least one flat section, and in that the removable driving stop comprises a flat surface held against this flat section;
- the first end element comprises two diametrically opposite flat sections, and in that the section of the removable driving stop has a circular portion prolonged by two straight portions fitted to the distance between the flat sections, and an open portion allowing the removable driving stop to be removed from the first end element;
- the removable driving stop comprises an elastic element for retention against the first end element;
- the removable driving stop comprises a handle;
- the second end element comprises a bearing flange for the elastic compression means, this flange having a bearing face cooperating with the first contact face of the removable driving stop;
- the device comprises a sliding cylinder coaxial with the axis of displacement, the first end element and the second end element being mounted to slide over this sliding cylinder;
- the sliding cylinder comprises a travel end stop for the operating member;
- the first end element comprises a tubular admission chamber for the sliding cylinder;
- the tubular admission chamber comprises a pressure balancing orifice;
- the sliding cylinder comprises a first hollow portion provided with a pressure balancing orifice;
- the pressure balancing orifice of the tubular admission chamber and the pressure balancing orifice of the sliding cylinder are both aligned on the axis of displacement;
- the first end element and the second end element are each mounted on the sliding cylinder by a friction ring;
- the sliding cylinder comprises a first portion and a second portion of different sections, the first end element being mounted to slide on the first portion and the second end element being mounted on the second portion;
- the sliding cylinder is fixed to the fixed stop element;
- the travel end stop is produced by a groove formed in the sliding cylinder, into which there is inserted an axial retaining finger secured to the second end of the operating member.

DESCRIPTION OF THE FIGURES

Other features and advantages of the invention will emerge from the description given of it hereinbelow, in an indicative and nonlimiting manner, with reference to the attached drawings, in which:

FIG. 1 represents a perspective view of an emergency opening device of an aircraft door, according to the invention, in its passive state;

FIG. 2 is a cross-sectional view taken along line X-X of the device of FIG. 1;

FIG. 3 represents a perspective view of the device of FIG. 1 in its active state;

FIG. 4 is a cross-sectional view taken along line X-X of the device of FIG. 3;

FIG. 6 represents a perspective view of the removable stop of the device of FIGS. 1 to 5;

FIG. 7 represents a cross section taken along line Y-Y of the device of FIG. 3 showing a section at the removable stop;

DETAILED DESCRIPTION

Figure 5:
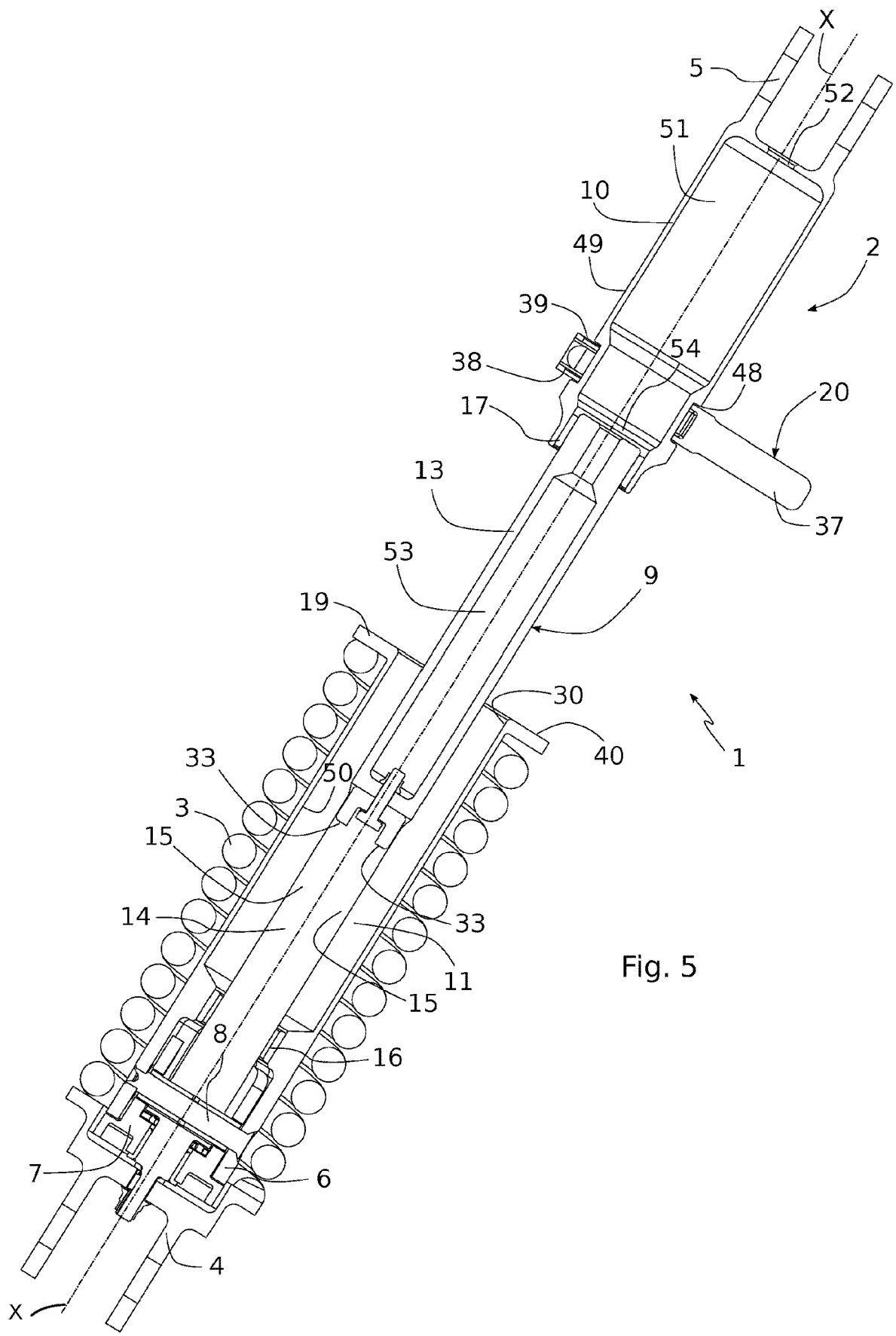
FIG. 5 is a cross-sectional view taken along line X-X of the device of FIG. 1 illustrating the service opening function.

FIGS. 1 and 2 represent an emergency opening device 1 according to the invention in its passive state. This device 1 takes the form of a compact actuator designed to provoke the emergency opening of an aircraft door provided with an opening mechanism. Aircraft doors are generally provided with an opening mechanism comprising, for example, systems of hinges and of support arms allowing the aircraft door to be movable between a closed position and an open position. This opening mechanism is used for a manual or motorized opening of the aircraft door for normal passenger embarkation and debarkation operations. The device 1 allows the automatic emergency opening of the aircraft door. To that end, the device 1 comprises means for actuating the aircraft door opening mechanism, these actuation means comprising a tubular operating member 2 and elastic compression means which are, in the present example, composed of a spring 3 of sufficient rating to provoke the rapid opening of the aircraft door in an emergency situation.

The operating member 2 is provided with a first end 5 linking with the door and the spring 3 is disposed between a fixed stop element 4 and the operating member 2. The spring 3, in the active state of the device 1, provokes a separation between the fixed stop element 4 and the first end 5 of the operating member. Thus, the device 1 can be mounted in the aircraft door opening mechanism, by a first fixing at the first end 5 of the operating member 2 and by a second fixing at the fixed stop element 4 in an arrangement in which the separation between these two fixings provokes the opening of the door.

The operating member 2 further comprises a so-called locking second end. This second end 6 is designed to cooperate with a retaining member here composed of a rotary hook 7 for holding the device in its passive state, ready to be activated, the spring 3 being compressed. The second end 6 of the operating member 2 comprises an axial retaining finger 8 fixed transversely to the second end 6 and the rotary hook 7 is designed to retain this finger 8 when the device 1 is in its passive state. The rotary hook 7 thus retains the operating member 2 by keeping the spring 3 compressed.

The rotary hook 7 is associated with a lever 18 which, when it is actuated in order to obtain the emergency opening, drives the rotation of the hook 7 and the releasing of the finger 8 then allowing the expansion of the spring 3 and consequently the switching of the device 1 to its active position.

The device 1 comprises a sliding cylinder 9 fixed onto the fixed stop element 4 and constituting an axis allowing the operating member 2 to slide with respect to the fixed stop element 4, on an axis of displacement X.

The operating member 2 is, here, produced in two parts: a first end element 10 on which the first end 5 is situated, and a second end element 11 on which the second end 6 is situated.

The sliding cylinder 9 comprises a first tubular portion 13 and a second tubular portion 14. In the present example, the second portion 14 has a greater diameter than the first portion 13. The second portion 14 also has an open-ended groove 15 in which the finger 8 is engaged.

The sliding of the operating member 2 over the sliding cylinder 9 is ensured on the one hand by a friction ring 16 guiding the sliding of the second end element 11 over the second portion 14, and, on the other hand, by a friction ring 17 guiding the sliding of the first end element 10 over the first portion 13. The rotary hook 7 is also mounted to rotate on the sliding cylinder 9.

The second end element 11 comprises, at its end opposite the second end 6, a bearing flange 19 for the spring 3. In FIGS. 1 and 2, the spring is therefore compressed between the flange 19 and the fixed stop element 4.

The first end element 10 comprises a removable stop 20 provided with a handle 37. The removable stop comprises a first contact face 38 with the second end element 11. The first contact face 38 is disposed in line with a bearing face 40 of the flange 19 so that the translation of the first end element 10 along the axis of displacement X, when the device is triggered, also drives the first end element 10 in translation via the removable stop 20. In the configuration of FIGS. 1 and 2, the removable stop 20 is in position on the second end element 11. Upon the operation of the lever 18 by a user in order to trigger the emergency opening, the rotary hook 7 releases the finger 8 and allows the expansion of the spring 3. Under the load of the spring 3, on the flange 19, the second end element 11 is translated on the axis of displacement X. The second end element 11 drives the removable stop 20 with it in translation by virtue of the first contact face 38. As for the removable stop 20, it drives the first end element 10 by means of a second contact face 39 disposed against a driving surface 41 of the first end element 10.

The force allowing the emergency opening of the aircraft door is thus transmitted from the spring 3 to the flange 19, then to the removable stop 20 by the first contact face 38, and to the first end element 5 by the second contact face 39.

Activation of the device 1 then leads to the position of FIGS. 3 and 4 corresponding to the total opening of the aircraft door. This position has been reached by virtue of the pressure of the flange 19 on the removable stop 20 and of the removable stop 20 on the first end element 10. However, at end of travel, as represented in FIGS. 3 and 4, the axial retaining finger 8 comes into abutment against the end 33 of the groove 15. This end 33 of the groove 15 constitutes an end-of-travel stop for the expansion movement of the spring 3.

According to a preferred feature, the operating member 2 thus comprises an end-of-travel stop 33 limiting its displacement under the effect of the thrust of the spring 3, which releases the pressure on the removable stop at the end of activation of the device so as to allow the withdrawal of the removable stop 20. In the end-of-travel position of FIGS. 3 and 4, the spring 3 is contained between the flange 19 and the fixed stop element 4 by virtue of the finger 8 being held against the end of the groove 15. The spring 3 therefore no longer exerts pressure on the removable stop 20.

The switching of the device 1 from its passive state of FIGS. 1 and 2 to its activated state of FIGS. 3 and 4 illustrates the operation of the device 1 when it is triggered for an emergency opening of the aircraft door.

FIG. 5 illustrates an additional function of the device 1 according to which the device 1 fulfils a service opening function. According to this service opening function, the first end element 10 slides freely along the first portion 13 of the sliding cylinder 9 while the second end element 11 is held in place by the rotary hook 7. During this sliding allowing the service opening function, the elements 10, 11 can be nested together and taken apart in the zone 12.

This possibility of sliding of the first end element 10 allows the opening and the closing of the door in the normal conditions of operation, without the device 1 being triggered.

The device 1 further fulfils another, so-called release function, allowing, when the device 1 is in its end-of-travel position of FIGS. 3 and 4 following the triggering of the emergency opening of the door, the aircraft door to be immediately reclosed.

FIG. 6 represents a perspective view of the removable stop 20. This stop 20 comprises a body 42 and a handle 37. The first and second contact faces are situated on either side of the body 42.

The body 42 also comprises a groove 55 on its inner surface. A leaf spring 43 is mounted in the groove 55 and fixed by rivets 56.

FIG. 7 illustrates the cooperation of this removable stop 20 with the rest of the device 1. FIG. 7 shows the section of the removable stop 20 and the section of the first end element 10 which cooperates with the removable stop 20. The concept of section refers to a cross section on the axis of displacement X.

The removable stop 20 is mounted in a groove 48 formed in an outer cylindrical portion 49 of the first end element 10, this groove 48 having two flat sections 44. The section of the removable stop 20 has a circular portion 45 and two straight linear portions 46 fitted to the distance between the flat sections 44. The section of the removable stop also has an open portion 47 allowing the removable stop 20 to be removed from the first end element 10.

The leaf spring 43 keeps the removable stop 20 in place on the first end element 10.

Figure 8:
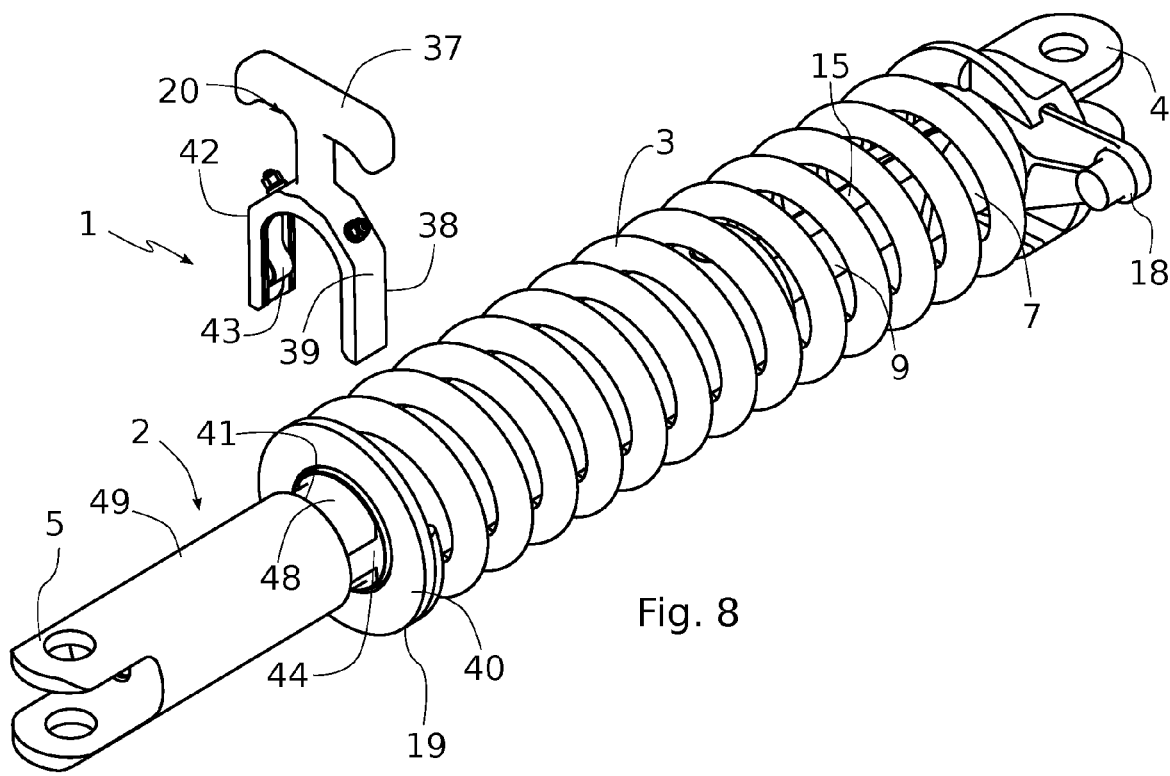
FIG. 8 represents a perspective view of the device of FIG. 3 and illustrates the operation of the removable stop in order to switch to released mode.
Figure 9:
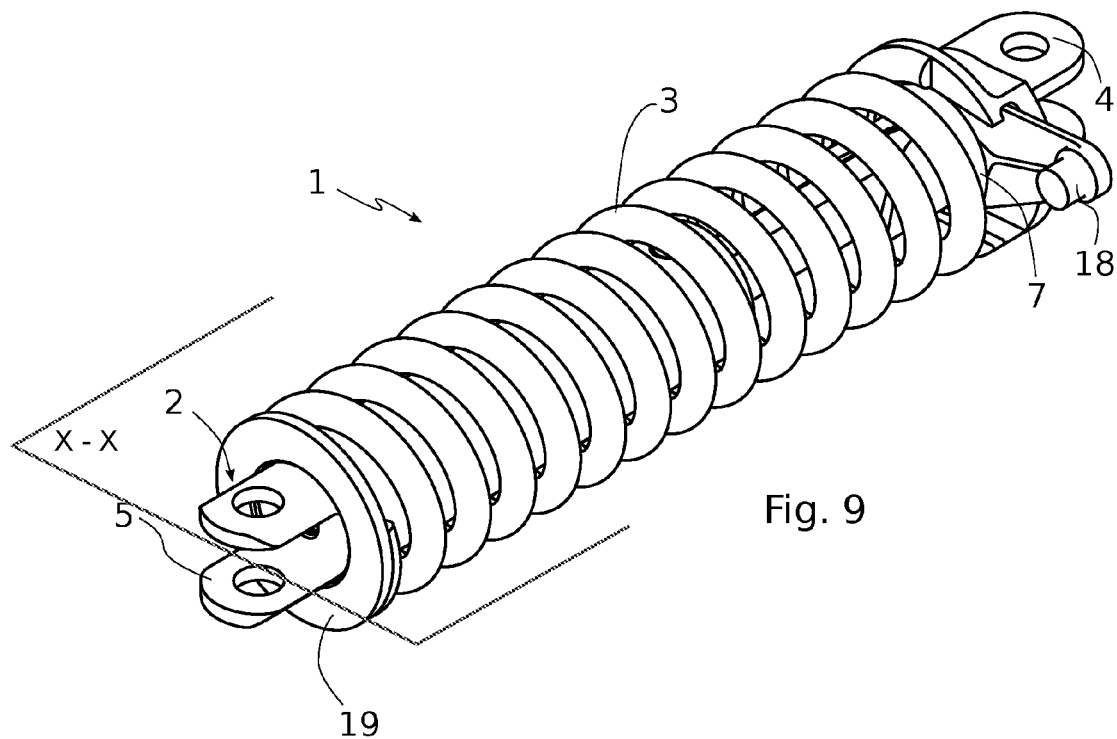
FIG. 9 represents the device of FIG. 7 in released mode.

FIGS. 8 and 9 illustrate the release function of the emergency opening device. The switching of the device 1 from its activated position at end of travel following an emergency opening (FIG. 3) to a release position in which the closure of the aircraft door is possible despite the activation of the device 1 (FIG. 8) is performed by simple operation of the removable stop 20.

From the position of FIG. 3, the user pulls on the removable stop 20 by the handle 37 with a force that is sufficient to elastically deform the leaf spring 43 in order to extract the removable stop 20.

The second end element 11 comprises a release opening 30 which is surrounded by the flange 19. The profile of the first end element 10 is fitted to this release opening 30 such that the first end element 10, when it has no removable stop 20, can slide freely in the opening 19.

The second end element 11 comprises an inner cylindrical portion 50 into which the outer cylindrical portion 49 of the first end element 10 can slide.

From the position of FIG. 8, the first end element 10 can therefore slide freely in the release opening 30 such that the aircraft door can be fully reclosed which corresponds to the position of FIG. 9.

Figure 10:
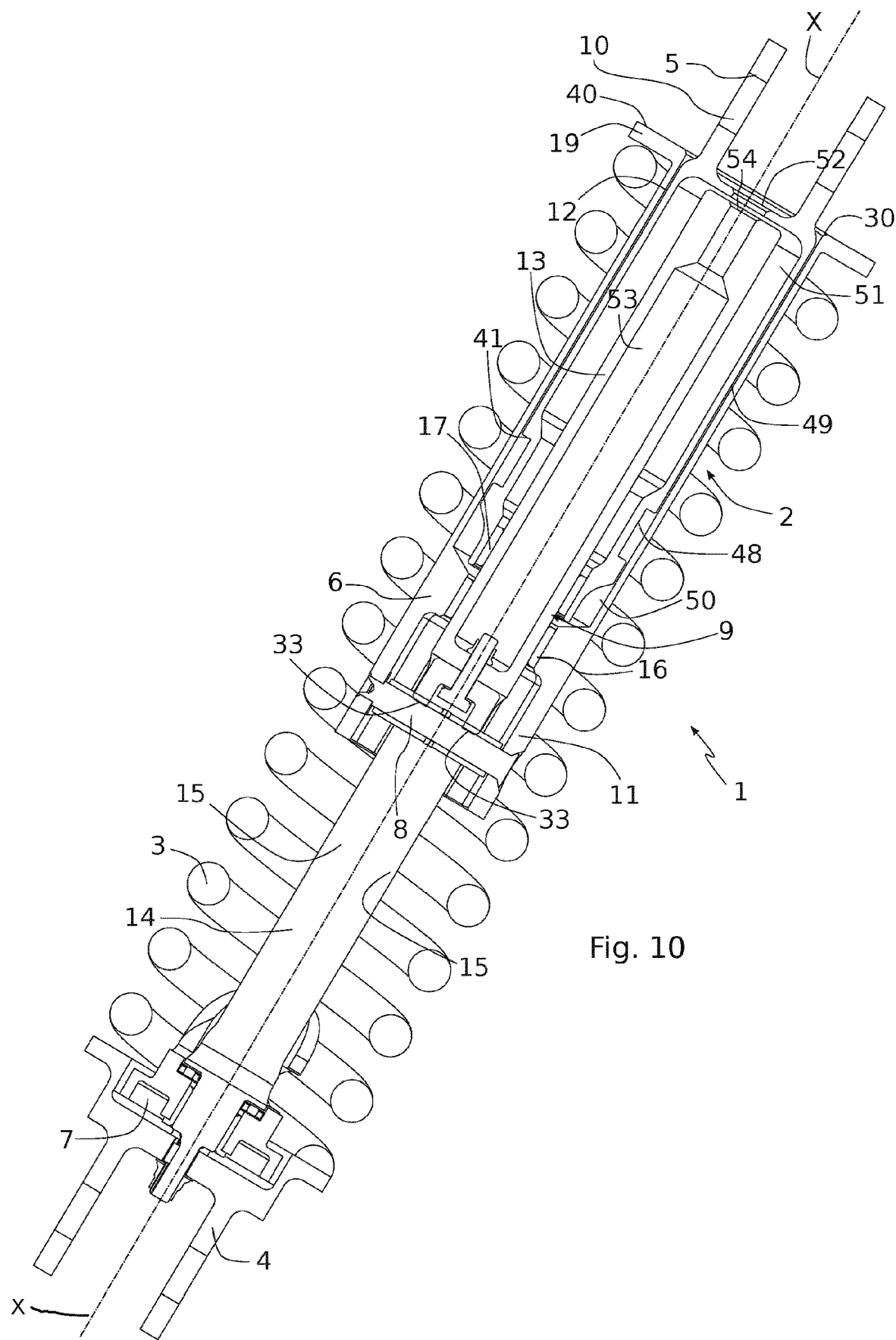
FIG. 10 is a cross-sectional view taken along line X-X of the device of FIG. 9.

FIG. 10 is a cross-sectional view of the device 1 in its position of FIG. 9. In this position, the first end element 10 has slid along the first portion 13 of the sliding cylinder 9. To this end, the first end element 10 has a tubular admission chamber 51 into which the sliding cylinder 9 can go. The tubular admission chamber 51 comprises a pressure balancing orifice 52 preventing the formation of an overpressure in the admission chamber 51, which would hamper the closing of the door in released mode. Likewise, the first portion 13 of the sliding cylinder 9 comprises a first hollow portion 53 which is also provided with a pressure balancing orifice 54. The two pressure balancing orifices 52, 54 are aligned on the axis of displacement X.

The sliding cylinder 9 combines the functions of:
guiding of the operating member 2 in translation on the axis of displacement X;
guiding of the first end element 10 in translation with respect to the second end element 11 both in the service opening function and during the releasing of the device 1;
guiding of the rotary hook 7 in rotation;
angular holding of the operating member 2 preventing the latter from turning about the axis of displacement X with respect to the fixed stop element 4;
end-of-travel stop for the operating member 2, the finger 8 coming into abutment against the end 33 of the groove 15 when the device 1 is in its activated state (see FIG. 4).

Variant embodiments of the device 1 can be implemented without departing from the scope of the invention. For example, the locking of the second end 6 of the operating member 2 can be done by any mechanical means. Likewise, the outer cylindrical portion 49 and the release opening 30 can have any form that can be fitted into one another when the removable stop 20 has been removed.

The invention claimed is:

1. An emergency opening device (1) for an aircraft door provided with an opening mechanism, the emergency opening device comprising:
an actuating device for the opening mechanism that switches between a passive state and an active state of activation of the opening mechanism, the actuating device comprising:
a tubular operating member (2) provided with a first end (5) linking with the door, and a locking second end (6); an elastic device (3) disposed between a fixed stop element (4) and the operating member (2); a retaining member (7) for the locking second end (6) that moves between a closed position of locking the locking second end (6), in a position of the operating member (2) corresponding to the passive state of the actuating device in which the elastic device (3) is kept compressed, and an open position of releasing the locking second end (6) allowing for the displacement of the operating member (2) on an axis of displacement (X) to a position corresponding to the active state of the actuating device, under the effect of the expansion of the elastic device (3);
an activation device (18) for the actuating device suitable for driving the opening of the retaining member (7);
wherein:
the operating member (2) comprises a first end element (10) and a second end element (11) that moves in translation with respect to one another on the axis of displacement (X), the first end (5) of the operating member (2) being situated on the first end element (10) and the locking second end (6) of the operating member (2) being situated on the second end element (11);
the first end element (10) comprises a removable driving stop (20) having a first face (38) for contacting the second end element (11).

2. The emergency opening device as claimed in claim 1, wherein the first end element (10) comprises an outer cylindrical portion (49) that fits into an inner cylindrical portion (50) of the second end element (11).

3. The emergency opening device as claimed in claim 2, wherein the removable driving stop (20) is mounted in a groove (48) formed in the outer cylindrical portion (49) of the first end element (10).

4. The emergency opening device as claimed in claim 1, wherein the first end element (10) comprises at least one flat section (44), and the removable driving stop (20) comprises a flat surface held against the flat section (44).

5. The emergency opening device as claimed in claim 4, wherein the first end element comprises two diametrically opposite flat sections (44), and the flat surface of the removable driving stop (20) has a circular portion (45) prolonged by two straight portions (46) extending a distance between the flat sections (44), and an open portion (47) allowing the removable driving stop (20) to be removed from the first end element (10).

6. The emergency opening device as claimed in claim 1, wherein the removable driving stop (20) comprises an elastic element (43) for retention against the first end element (10).

7. The emergency opening device as claimed in claim 1, wherein the removable driving stop (20) comprises a handle (37).

8. The emergency opening device as claimed in claim 1, wherein the second end element (11) comprises a bearing flange (19) for the elastic device (3), the bearing flange (19) has a bearing face (40) facing a first contact face (38) of the removable driving stop (20).

9. The emergency opening device as claimed in claim 1, further comprising a sliding cylinder (9) coaxial with the axis of displacement (X), the first end element (10) and the second end element (11) being mounted to slide on the sliding cylinder (9).

10. The emergency opening device as claimed in claim 9, wherein the sliding cylinder (9) comprises a travel end stop (33) for the operating member (2).

11. The emergency opening device as claimed in claim 9, wherein the first end element (10) comprises a tubular admission chamber (51) for the sliding cylinder (9).

12. The emergency opening device as claimed in claim 11, wherein the tubular admission chamber (51) comprises a pressure balancing orifice (52).

13. The emergency opening device as claimed in claim 11, wherein the sliding cylinder (9) comprises a first hollow portion (53) provided with a pressure balancing orifice (54).

14. The emergency opening device as claimed in claim 12, wherein the pressure balancing orifice (52) of the tubular admission chamber (51) and the pressure balancing orifice (54) of the sliding cylinder (9) are both aligned on the axis of displacement (X).

* * * * *